United States Patent
Klimek

[11] 3,866,623
[45] Feb. 18, 1975

[54] TRACTOR PROTECTION VALVE

[75] Inventor: Boleslaw Klimek, Des Plaines, Ill.

[73] Assignee: The Berg Manufacturing Companay, Des Plaines, Ill.

[22] Filed: Dec. 10, 1973

[21] Appl. No.: 423,165

[52] U.S. Cl. .................... 137/102, 137/111, 303/29
[51] Int. Cl. ............................................. B60t 15/36
[58] Field of Search ... 137/102, 111, 489.5, 505.18, 137/106, 109; 303/29, 23 R

[56] References Cited
UNITED STATES PATENTS

| | | | |
|---|---|---|---|
| 2,850,330 | 9/1958 | Andrews | 303/29 |
| 2,859,763 | 11/1958 | Fites | 137/102 |
| 2,979,069 | 4/1961 | Valentine | 137/102 |
| 3,109,442 | 11/1963 | Horowitz | 137/111 |
| 3,240,223 | 3/1966 | Horst | 137/505.18 X |
| 3,304,131 | 2/1967 | Bueler | 303/29 |
| 3,413,040 | 11/1968 | Horowitz | 137/102 X |
| 3,510,172 | 5/1970 | Pekrul | 137/102 X |
| 3,653,721 | 4/1972 | Klimek | 137/102 X |
| 3,654,948 | 4/1972 | Nelson | 137/489.5 X |

*Primary Examiner*—William R. Cline

[57] ABSTRACT

A tractor protection valve for use in the air brake system of a tractor-trailer vehicle combination to protect and maintain the braking system of the tractor in case of failure of the emergency braking system. The valve has a shuttle which normally closes communication between the emergency inlet and outlet and a piston which normally closes communication between the service inlet and outlet. A small shuttle valve gives the shuttle in which it is mounted a dual action characteristic. The application of fluid pressure at the emergency inlet causes the shuttle to move through a fixed distance thereby closing communication between the emergency outlet and an exhaust port. Further movement of the shuttle unseats the small shuttle valve and opens communication between the emergency inlet and outlet. Pressure at the emergency outlet causes the piston to move thereby opening communication between the service inlet and outlet.

10 Claims, 1 Drawing Figure

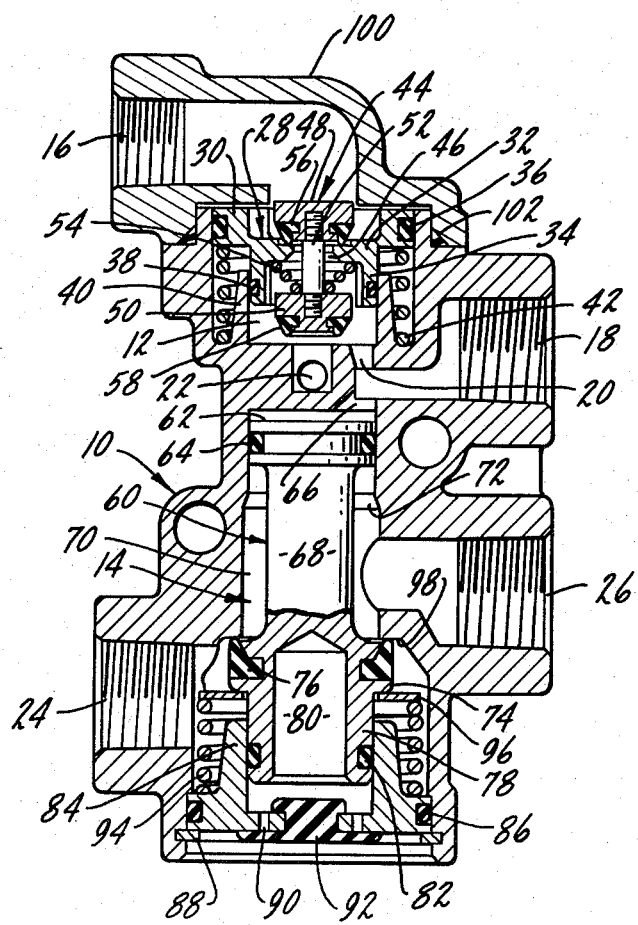

[3,866,623]

TRACTOR PROTECTION VALVE

SUMMARY OF THE INVENTION

The present invention relates to valves of vehicle air brake systems and has particular relation to means for protecting the air brake system of a tractor in a tractor-trailer vehicle combination.

A primary purpose of the invention is to provide a tractor protection valve in which a small valve is mounted on a moveable shuttle such that initial movement of the shuttle-valve combination through a fixed distance closes an exhaust port and further movement of the shuttle alone opens the small valve allowing passage of fluid pressure through the shuttle.

Another purpose is a tractor protection valve in which movement of the shuttle is initiated by the application of fluid pressure at an emergency inlet port.

Another purpose is a tractor protection valve including means insuring against delivery of fluid pressure to a trailer emergency brake system until a safe pressure is present in the tractor emergency brake system.

Another purpose is to provide a tractor protection valve including means for preventing delivery of fluid pressure from the tractor brake system to the trailer brake system until a safe pressure is present in the emergency brake system of both the tractor and trailer.

Other purposes will appear in the ensuing specification, drawing and claims.

BRIEF DESCRIPTION OF THE DRAWINGS

The invention is illustrated diagramatically in the following drawing wherein:

The FIGURE is a side elevation in cross section of the valve.

DESCRIPTION OF THE PREFERRED EMBODIMENT

Referring to the drawing, the valve of the present invention includes a valve housing 10 defining a first chamber 12 and a second chamber 14.

An emergency inlet 16, an emergency outlet 18 and a first exhaust port 22 communicate with the first chamber 12, the emergency outlet 18 communicating with the first chamber 12 through a passage 20 opening into the lower end of said chamber. A service inlet 24 communicates with the second chamber 14 at an intermediate point thereof and a service outlet 26 communicates with the opposite side of the second chamber 14 at a point spaced from the point of communication of the service inlet 24.

A shuttle 28 is contained within the first chamber 12. The shuttle 28 consists of an outer annular portion 30 integral with a web portion 32, the surfaces of which are generally normal to the axis of the first chamber 12, said web having an integral short cylindrical portion 34 extending downward from the outer edge thereof. The outer portion 30 may mount a seal ring 36 to form a seal between the outside surface of the outer portion 30 and the peripheral surface of the first chamber 12. The cylindrical portion 34 may also mount a seal ring 38 to form a seal between the outside surface of the cylindrical portion 34 and the inside peripheral surface of the shuttle retainer portion 40 of the housing 10. The shuttle is urged toward a first position as shown in the drawing by a spring 42 which is positioned about retainer 40.

A small shuttle valve 44 is mounted in an aperture 46 through the web portion 32 of the shuttle 28. The small shuttle valve 44 consists of upper and lower valve heads 48 and 50 affixed to the ends of a valve stem 52 which has a considerably smaller diameter than that of the aperture 46 through which it passes. A spring 54 urges the lower valve head 50 downward and away from the web portion 32 of the shuttle 28 as far as permitted by the limited length of the valve stem 52. Thus the upper valve head 48 at the other end of the valve stem 52 is urged to seat against a narrow circumferential area of the web 32 around the aperture 46. In the embodiment shown in the drawing the upper surface of the web 32 against which the upper valve head 48 seats is disposed slightly lower than the remainder of the upper surface of the web 32 and the lower portion of the aperture 46 is flared conically outward. The upper valve head 48 may mount a seal 56 for forming a seal between upper valve head 48 and the upper surface of the shuttle web portion 32. Likewise, the lower valve head 50 may mount a seal 58 for forming a seal between the lower valve head 50 and a narrow annular area of the first chamber surrounding the opening to the first exhaust port 22 when the shuttle is depressed due to fluid pressure as will be described in greater detail herein below. Relative to such motion of the shuttle assembly which includes the shuttle 28 and the small shuttle valve 44, it will be observed that the lower valve head 50 is spaced apart from the bottom surface of the first chamber 12 by a fixed first distance and the outer portion 30 of the shuttle 28 is spaced apart from the shuttle retainer 40 by a fixed second distance, greater than the first fixed distance, when the shuttle assembly is in its first position as shown in the drawing.

A piston 60 is slideably retained in second chamber 14 for regulating communication between the service inlet and outlet 24 and 26. The upper end of the piston 60 includes a large surface 62 which, with the seal 64 that it carries, is presented to fluid pressure entering the second chamber through the passage 66 from the emergency outlet 18. Below the surface 62 the piston 60 has a solid rod portion 68 which has a smaller diameter than the portion of the second chamber in which it is free to travel, thereby creating a space 70 between the piston rod portion and the walls of the second chamber through which fluid pressure can be communicated around the piston 60. The second chamber may be expanded conically downward as indicated at 72 in order to enlarge the volume of space 70 without decreasing the diameter of the solid rod 68. The service outlet 26 penetrates the wall of the second chamber 14 through the enlarged area surrounding the solid rod 68. Below and adjacent the solid rod 68 the piston 60 has an expanded surface 74 which carries a seal 76. The remaining lower portion 78 of the piston 60 which has a constant diameter smaller than that of the expanded surface 74, has a well 80 formed therein open through the bottom of the piston 60 and extending axially upward through the expanded surface 74 of the piston. A seal 82 may be mounted adjacent the bottom edge of the lower portion 78 of the piston 60 to form a seal between the piston and the piston retainer 84. A seal ring 86 forms a seal between the inner wall of the valve housing 10 and the piston retainer which is held in place by a retaining ring 88. A second exhaust port 90 opens through the center of the piston retainer 84 and has a flapper valve 92 forming a closure therefore, with the flapper valve conventionally being operated to permit air pressure within the valve to exhaust.

A spring 94, mounted on the external periphery of the piston retainer 84, pushes a ring 96 against the bottom edge of the expanded surface 74 of the piston thereby urging the piston seal 76 against an annular surface 98 of the second chamber 14 which is disposed between the service inlet and outlet 24 and 26 and transverse to the axis of the piston.

For ease of assembly that portion of the housing 10 which defines the top surface of the first chamber 12 and the emergency inlet 16 may be formed as a separate cover 100 and engaged onto the housing 10 with an O-ring 102.

The use, operation and function of the invention are as follows:

In use, the valve of the present invention is engaged along the brake lines between a tractor and trailer to regulate the communication of fluid pressure between them. Brake lines of the tractors emergency and service brake systems are connected to the emergency and service inlets 16 and 24 respectively and lines feeding the trailers emergency and service brake systems run from the emergency and service outlets 18 and 26 respectively. Initially, before fluid pressure is applied through the inlet ports 16 and 24 springs 42 and 54 are effective to position shuttle 28 and the small shuttle valve 44 in the position shown in the drawing and spring 94 is effective to position the piston 60 in the position shown in the drawing. Thus initially there is no communication between the emergency inlet and outlet nor between the service inlet and outlet.

When sufficient pressure is supplied at the emergency inlet 16, the pressure differential areas on the shuttle assembly, including the top surfaces of the upper valve head 48 and the web portion 32, will initially cause the entire shuttle assembly to move downwardly against the shuttle spring 42. The shuttle assembly will move to a second position in which the seal 58 of the small shuttle valve 44 will seat on the bottom of the first chamber 12 thereby closing off the first exhaust port 22 and the emergency outlet 18 and preventing further downward movement of the small shuttle valve 44. The shuttle 28 but not valve 44 will continue to move downward to a third position against the force of both springs 42 and 54. This movement will unseat the upper valve head 48 from the web portion 32 of the shuttle 28 thereby allowing fluid pressure to be communicated around the valve stem 52 through the shuttle aperture 46 and passage 20 and into the emergency outlet 18. Fluid pressure will thus be built up in emergency outlet 18, but only if the emergency brake systems of the tractor and trailer are connected and operating properly. A leak in the tractor emergency brake system will prevent sufficient pressure being built up at the emergency inlet 16 to move the shuttle 28 from its first position. The disconnection of or leak in the trailer emergency brake system will likewise prevent the accumulation of pressure at the emergency outlet 18.

In the event that the emergency brake systems of the tractor and trailer are connected and operating properly, pressure will be accumulated at the emergency outlet 18 and communicated through passage 66 to the second chamber 14 above the piston 60. Sufficient pressure presented to the top piston surface 62 will force the piston to move downward against spring 94. This movement will unseat the piston seal 76 from the annular surface 98 of the second chamber 14 thereby opening communication from the service inlet 24 through the space 70 around the piston rod 68 and into the service outlet 26. Any air trapped in the bottom of the second chamber 14 will be forced out through the flapper valve 92 of the second exhaust port 90 by the downward movement of the piston 60.

Upon a reduction in pressure at the emergency outlet 18 below the level required to counteract the force of spring 94, the piston 60 will be urged back to its original position with the piston seal 76 again blocking communication between the service inlet and outlet 24 and 26.

In effect, the present invention prevents any tap into tractor brake system for the trailer brakes until the emergency brake systems of both the tractor and trailer are connected and properly function. Much of the desired result is accomplished by the dual action shuttle assembly. After the combination of both the shuttle and the small shuttle valve is moved to the second position the first exhaust port is closed, and further movement of the shuttle alone to its third position then opens communication between the emergency inlet and outlet and tractor and trailer emergency brake lines.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The embodiments of the invention in which an exclusive property or privilege is claimed are defined as follows:

1. A tractor protection valve including a housing having a first and second chamber, an emergency inlet and outlet and a first exhaust port in communication with said first chamber, a service inlet and outlet and a second exhaust port in communication with said second chamber and a passage in said housing opening communication between said emergency outlet and said second chamber;

a shuttle in said first chamber between said emergency inlet and outlet including a second small shuttle valve therein, spring means urging said shuttle toward a first position and said small shuttle valve toward its closed position, closing communication between said emergency inlet and outlet, said emergency outlet being in open communication with said first exhaust port when said shuttle is in said first position;

a piston in said second chamber and means yielding urging it toward a position in which a piston seal engaged thereon closes communication between said service inlet and outlet;

fluid pressure entering said emergency inlet causing said shuttle to move initially toward a second position in which the small shuttle valve closes the first exhaust port and then toward a third position in which the small shuttle valve is forced open, completely opening communication between the emergency inlet and outlet; the resultant fluid pressure at the emergency outlet causing said piston to travel within said second chamber unseating said piston seal and thus opening communication between said service inlet and outlet.

2. The structure of claim 1 wherein the small shuttle valve consists of first and second valve heads connected to the ends of a short resilient stem which passes through an aperture in the shuttle having a greater cross-section area than the valve stem.

3. The structure of claim 2 wherein the first valve head is disposed on the emergency inlet side of the shuttle and is yieldingly urged to seal against a circumferencial area around said shuttle aperture, said second valve head being disposed on the emergency outlet and first exhaust port side of the shuttle and being yieldingly urged downward and away from the shuttle surface surrounding the aperture as far as permitted by the limited length of the valve stem.

4. The structure of claim 3 further characterized by and including seals on said first and second valve heads, the seal on the first valve head being positioned to seal against a circumferencial area around said shuttle aperture and the seal on the second valve head being positioned to seal against a circumferencial area of the second chamber around the first exhaust port.

5. The structure of claim 2 further characterized in that the entire shuttle unit which includes the small shuttle valve is disposed within the first chamber such that the application of fluid pressure at the emergency inlet causes the entire shuttle unit to move through the distance between said second valve head and first exhaust port opening, said second valve head closing communication between the first exhaust port and the emergency outlet and preventing further travel of the small shuttle valve; the fluid pressure causing the shuttle to move through an additional limited distance unseating the first valve head from the shuttle surface surrounding the shuttle aperture annd allowing said fluid pressure to be communicated through said shuttle aperture into said emergency outlet.

6. The structure of claim 1 further characterized in that said piston includes at least one seal engaging said second chamber between said passage to the emergency outlet and the service outlet to prevent communication therebetween at all positions of said piston; and at least one other seal engaging said second chamber between said second exhaust port and said service inlet, likewise to prevent communication therebetween in all positions of said piston.

7. The structure of claim 6 further characterized in that said piston includes a large surface which carries a seal engaging said second chamber between said passage to the emergency outlet and the service outlet, said surface and its seal being presented to fluid pressure entering said second chamber through the passage to the emergency outlet; and said piston seal positioned to close communication between the service inlet and outlet, as the piston is yieldingly urged toward one end of the chamber, said piston thus being moveably in response to fluid pressure entering said second chamber thereby unseating the piston seal and opening communication between the service inlet and outlet, the air trapped in the end of the second chamber toward which the piston moves being forced out through the second exhaust port allowing for motion of the piston within the second chamber.

8. The structure of claim 7 further characterized in that said piston seal is an annular member engaged in a circumferencial groove in said piston.

9. The structure of claim 8 further characterized in that said second chamber includes an enlarged portion between said service inlet and outlet of greater diameter than the remainder of the chamber, said piston seal adapted to travel within said portion being yieldingly urged against the inner annular end surface of said widened portion.

10. The structure of claim 1 further characterized by and including a spring which urges said piston toward a position in which said piston seal closes communication between said service inlet and outlet.

* * * * *